(12) United States Patent
Trankiem

(10) Patent No.: US 7,247,249 B2
(45) Date of Patent: Jul. 24, 2007

(54) METHOD OF TREATING RAZOR BLADE CUTTING EDGES

(75) Inventor: Hoang Mai Trankiem, Boston, MA (US)

(73) Assignee: The Gillette Company, Boston, MA (US)

( * ) Notice: Subject to any disclaimer, the term of this patent is extended or adjusted under 35 U.S.C. 154(b) by 370 days.

(21) Appl. No.: 11/033,181

(22) Filed: Jan. 11, 2005

(65) Prior Publication Data

US 2005/0155460 A1 Jul. 21, 2005

(51) Int. Cl.
*B44C 1/22* (2006.01)
*B05D 3/02* (2006.01)
*C03C 15/00* (2006.01)
*C03C 25/68* (2006.01)
*C23F 1/00* (2006.01)

(52) U.S. Cl. .................. 216/11; 427/337; 427/388.4; 216/83; 216/95; 428/421

(58) Field of Classification Search ............ 216/11, 216/83, 95; 427/388.1, 388.4, 337; 30/346.5, 30/346.54, 346.55, 346.58
See application file for complete search history.

(56) References Cited

U.S. PATENT DOCUMENTS 5,985,459 A 11/1999 Kwiecien et al.

*Primary Examiner*—Parviz Hassanzadeh
*Assistant Examiner*—Roberts Culbert
(74) *Attorney, Agent, or Firm*—Fish & Richardson P.C.

(57) ABSTRACT

Methods treating razors blade cutting edges having an adherent polyfluorocarbon coated thereon are described. The coated razor blade edges are treated with a solvent, which partially removes the coating from the razor blade edge. Addition of an antioxidant to the solvent improves the effectiveness of the treatment.

39 Claims, 1 Drawing Sheet

METHOD OF TREATING RAZOR BLADE CUTTING EDGES

TECHNICAL FIELD

This invention relates to razor blades, and more particularly to methods of treating razor blades.

BACKGROUND

Razor blades are treated with a coating such as polytetrafluoroethylene (PTFE), sometimes referred to as "telomer," in order to reduce the cutting force required to use the razor blade. However, in many instances, the coating is applied too thick for optimal shaving comfort, especially during the first shave. The thick coating on the blade edge is pushed back during shaving, resulting in increased shave performance after the first shave. Accordingly, efforts have been directed towards reliably and reproducibly thinning the blade coating to simulate the effects of the "pushed back" coating.

In some instances, a portion of the coating is selectively removed using a solvent to provide a thin layer, which can improve the characteristics of the razor especially on the first shave. These methods are disclosed in U.S. Pat. No. 5,985,459 to Kwiecien et al.

SUMMARY

The present invention relates to razor blade cutting edges that exhibit an improvement in the "first shave" cut. As discussed above, one method of thinning the blade coating is to use a solvent to remove a portion of the coating, leaving a thin uniform layer on the blade edge. The inventor has discovered that the inclusion of an antioxidant in the solvent solution provides improved thinning, as the antioxidant helps improve the stability of the solvent, which provides consistent thinning of the blade coating over the treatment of a large number of batches of blade edges.

In one aspect, the invention features a method of treating a polyfluorocarbon coated razor blade. The method includes contacting a polyfluorocarbon coated razor blade with a solution of a solvent and an antioxidant, thereby partially removing the polyfluorocarbon coating from the razor blade.

In some instances, the polyfluorocarbon includes polytetrafluoroethylene.

In some instances, the antioxidant includes a phenol moiety, for example the phenol moiety of formula I

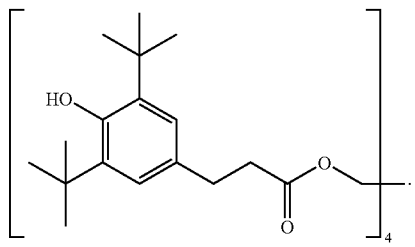

formula I

The antioxidant can include an organophosphorous moiety, for example, the organophosphorous moiety of formula II

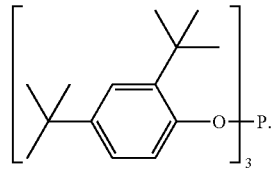

formula II

The antioxidant can include a lactone and/or a hydroxylamine. The concentration of antioxidant in the solvent can be less than about 0.1% (e.g., less than about 0.05% or less than about 0.01%). The antioxidant can be stable at a temperature greater than or equal to the boiling point of the solvent.

In some instances, the solvent includes at least one of a perfluoroalkane, perfluorocycloalkane, perfluoroaromatic or an oligomer thereof (e.g., dodecafluorocyclohexane, octafluoronapthalene, perfluorotetracosane, perfluorotetradecahydrophenanthrene, isomers of perfluoroperhydrobenzylnaphthalene, erfluorotetradecahydrophenanthrene, high-boiling oligomeric byproduct in the manufacture of perfluorotetradecahydrophenanthrene, or perfluoropolyethers). In some instances, the solvent includes perfluoroperhydrophenanthrene oligomer having the general formula $C_{14}F_{23}(C_{14}F_{22})_nC_{14}F_{23}$ wherein n is 0, 1, or 2, or perfluorotetradecahydrophenanthrene. In some instances, solvent includes a plurality of antioxidants.

In some instances, the method also includes removing the solvent subsequent to contact with the razor blade. The solvent can be removed, for example, by dipping the blade in a wash solution. The temperature of the wash solution can be near the boiling point of the wash solution. In some instances, the wash solution includes perfluoro (2-n-butylhydrofuran). In some instances, the boiling point of the solvent is greater than the dissolution temperature for the polyfluorocarbon in the solvent. For example, the razor blade can be treated with solvent at a temperature below the boiling point of the solvent but greater than or equal to the dissolution temperature for the polyfluorocarbon in the solvent. Alternatively, the razor blade can be treated with solvent at a temperature above the boiling point of the solvent and greater than or equal to the dissolution temperature for the polyfluorocarbon in the solvent.

In some instances, the razor blade is coated with a polyfluorocarbon by applying a dispersion of the polyfluorocarbon onto the razor blade and subsequently heating the dispersion to a temperature sufficient to adhere the polyfluorocarbon to the razor blade. The dispersion can be applied onto the razor blade, for example, by spraying the dispersion onto the razor blade or by dipping the razor blade into the dispersion.

In some instances, the razor blade includes a cutting edge and the cutting edge is coated with a polyfluorocarbon.

In some instances, the method includes filtering the solution.

In some instance, the method includes contacting the polyfluorocarbon coated razor blade with a plurality of antioxidants. The antioxidants can include, for example, a phenyl containing moiety and an organophosphorous containing moiety. Examples of such antioxidants include the antioxidants of formulas I and II

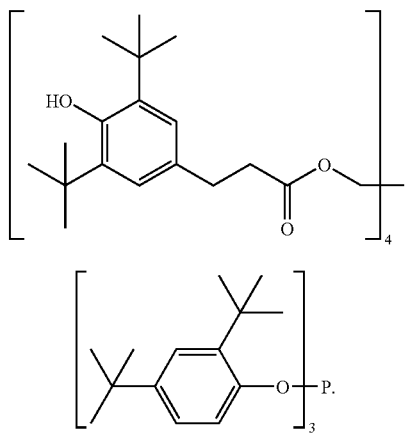

formula I and formula II

In some instances, the antioxidants of formula I and formula II are present in the ratio of 1/2.

In some instances, the temperature of the solution is between about 200 and 400° C. (e.g., between about 250 and about 350° C., between about 260 and about 300° C., or about 280° C.

In some instances, the solution is subjected to a pressure of between about 30 and 120 psi (e.g., between about 40 and 60 psi).

In another aspect, the invention features a method of treating a polyfluorocarbon coated razor blade that includes contacting a polyfluorocarbon coated razor blade with a solution of a perfluoroperhydrophenanthrene and a 1/2 ratio of the compounds of formula I and formula II

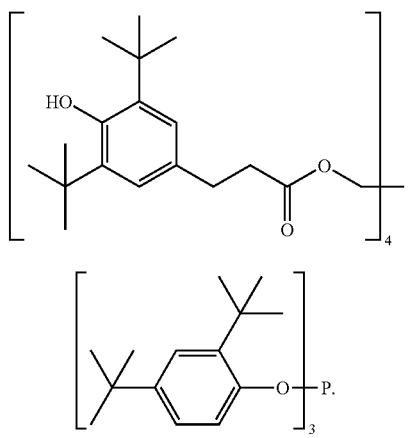

formula I and formula II

The details of one or more embodiments of the invention are set forth in the accompanying drawings and the description below. Other features and advantages of the invention will be apparent from the description and drawings, and from the claims.

DETAILED DESCRIPTION

Figure 1:
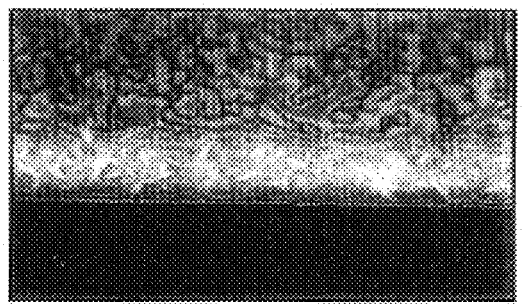
FIG. 1 is a photomicrograph of a polyfluorocarbon treated razor blade edge prior to treatment with an antioxidant containing solvent.

Methods of coating razor blade edges with polyfluorocarbons are known in the art and are disclosed, for example, in U.S. Pat. No. 5,263,256 to Trankiem. However, these methods generally produce a blade having a relatively thick initial coating of polymer. (See FIG. 1.) This can result in disproportionately high cutting force during the first shave. One method for improving the first shave characteristics is to thin the polymer coating, for example using a solvent to remove a substantial portion of the coating. As discussed above, this method is disclosed in U.S. Pat. No. 5,985,459, the complete disclosure of which is incorporated herein by reference.

The inventor has discovered that the addition of an antioxidant to the solvent improves the reproducibility of these methods of thinning the polyfluorocarbon coating. The lubricity of the telomer coating depends, in part, on the molecular weight of the polymer, so it is desirable to use different molecular weights depending on the desired lubricity for a particular application (e.g., a men's razor blade versus a woman's razor blade). Additionally, the lubricity of the telomer coating can be affected by the hard coating of the razor blade. Addition of the antioxidant improves the reproducibility of the processing conditions regardless of the molecular weight of the telomer and the hard coating of the razor blade.

Figure 2:
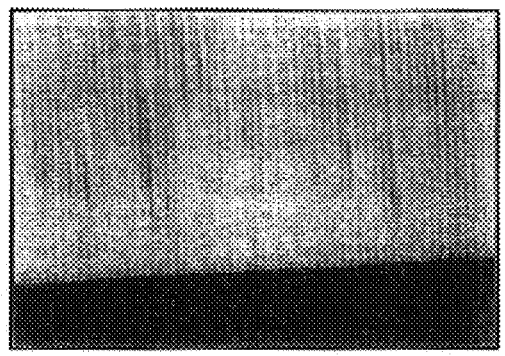
FIGS. 2 and 3 are photomicrographs of the polyfluorocarbon treated razor blade edge after treatment with an antioxidant containing solvent.
Figure 3:
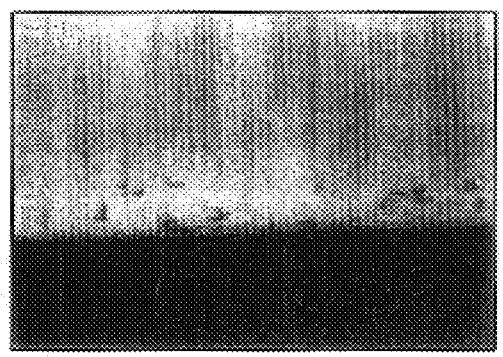

Methods of Treating a Coated Blade:

A blade coated with a polyfluorocarbon is treated with a suitable solvent and an antioxidant (or a plurality of antioxidants) to remove excess polyfluorocarbon from the blade edge, thus providing a thin polyfluorocarbon layer. (See FIGS. 2 and 3.) The blade is coated and solvent treated as described in U.S. Pat. No. 5,985,459. Suitable solvents and process parameters will be discussed in detail below.

The antioxidant can include a phenolic stabilizer, such as in Irganox B-215 (Supplier Ciba SpecialChem). Phenolic antioxidants are excellent hydrogen donors and are used in the industry to stabilize polymers. For examples, ROO* radicals are deactivated by hindered phenol via the following reaction:

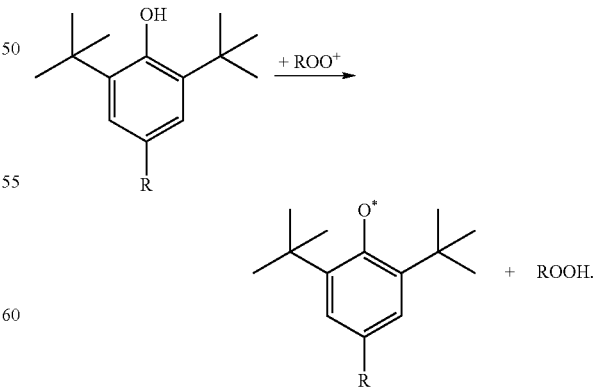

The phenoxy radical generated is very stable due to its ability to adopt numerous mesomeric forms. Examples of phenolic antioxidants are provided in Table 1 below:

TABLE 1
Phenolic Antioxidants
1
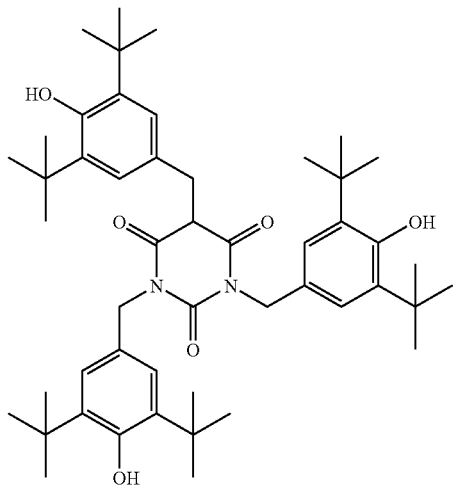
2
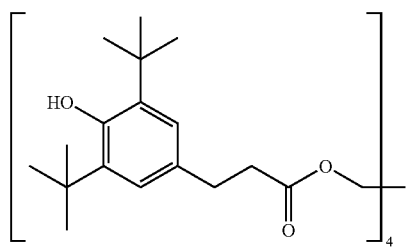
3
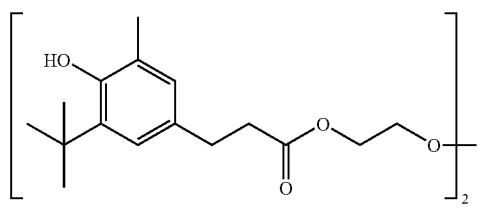
4
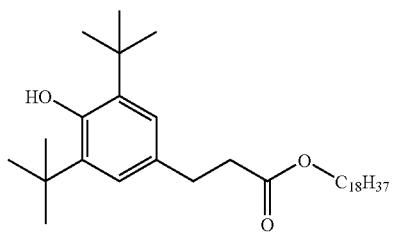

TABLE 1-continued
Phenolic Antioxidants
5
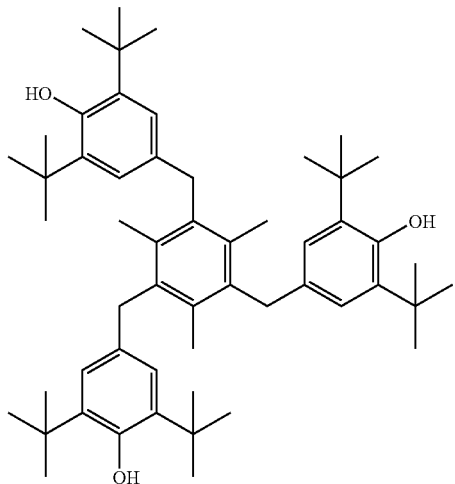
6
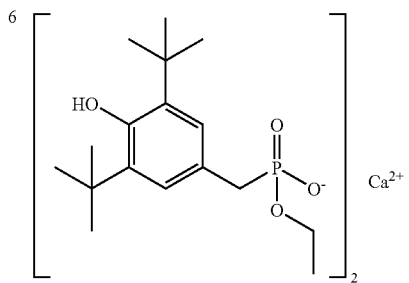
7
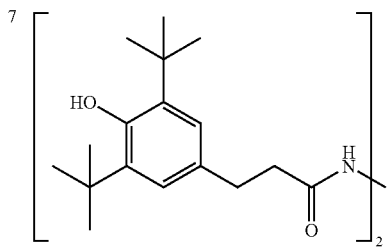
8
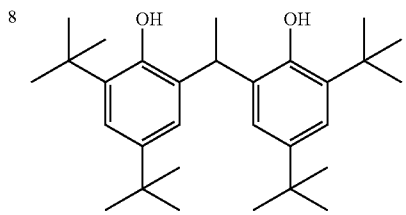
9
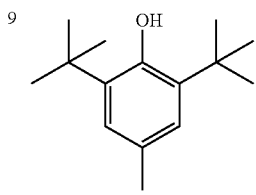

TABLE 1-continued

Phenolic Antioxidants

10

[Structure: 2-methyl-4,6-bis(octylthiomethyl)phenol — phenol with OH, methyl group, and two CH$_2$-S-C$_8$H$_{17}$ substituents]

11

[Structure: α-tocopherol (Vitamin E) — chromanol ring with HO group, three methyl substituents, and phytyl side chain]

12

[Structure: bis[ethyl 3-(3,5-di-tert-butyl-4-hydroxyphenyl)propionate] thioether — shown as bracketed unit with subscript 2, connected through S]

Alternatively or in addition to including a phenolic moiety, the antioxidant can include an organophosphorous compound. These compounds are useful in the decomposition of hydroperoxide and prevent the split of hydroperoxides into extremely reactive alkoxy and hydroxy radicals. Some examples of organophosphorous antioxidant compounds include those listed in Table 2 below.

TABLE 2

Organophosphorous antioxidant compounds

20

[Structure: tris(2,4-di-tert-butylphenyl) phosphite — bracketed aryl-O group with subscript 3 attached to P]

21

[Structure: bis(2,4-di-tert-butylphenyl) pentaerythritol diphosphite — two 2,4-di-tert-butylphenyl groups connected via O-P to a spiro bicyclic pentaerythritol diphosphite core]

22

[Structure: distearyl pentaerythritol diphosphite — C$_{18}$H$_{37}$-O-P connected to spiro bicyclic pentaerythritol diphosphite core, then P-O-C$_{18}$H$_{37}$]

TABLE 2-continued
Organophosphorous antioxidant compounds
23 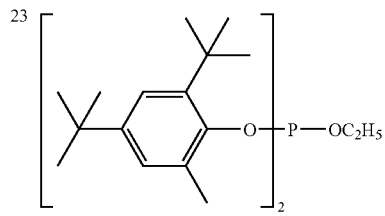
24 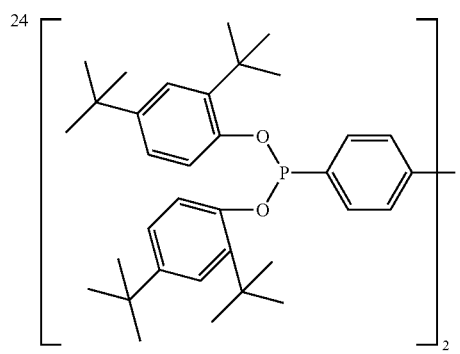
25 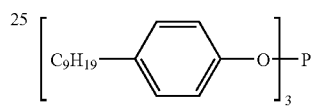
26 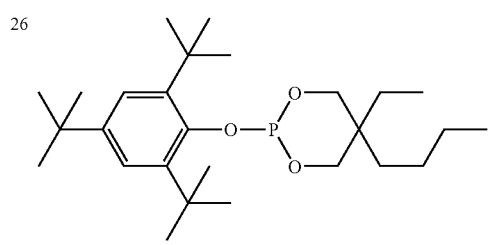
27 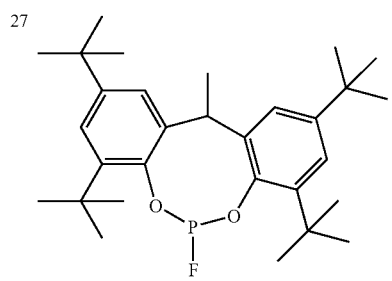
28 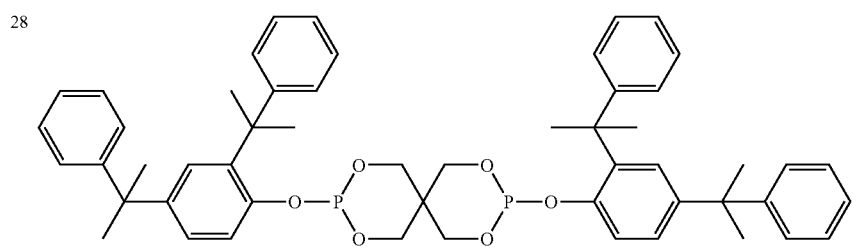

TABLE 2-continued

Organophosphorous antioxidant compounds

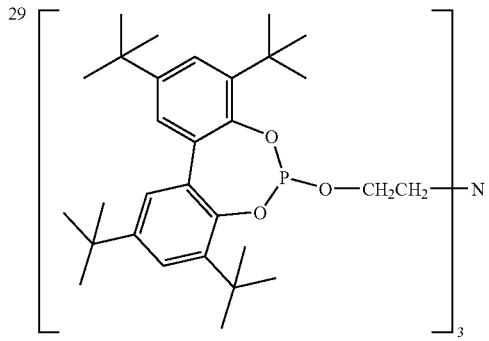

Lactones and hydroxylamine compounds can also be used as antioxidants. These compounds are particularly useful in scavenging alkyl radicals, thus inhibiting the autooxidation cycle. Under oxygen-deficient conditions alkyl radical scavengers contribute significantly to the stabilization of the polymer. In many instances lactone antioxidants are used in combination with phenolic antioxidants and phosphite antioxidants, thus providing high performance even at low concentrations. Some examples of lactone and hydroxylamine antioxidants include substituted benzofuranone and those shown in Table 3 below.

TABLE 3

Benzofuranone and hydroxylamine antioxidants

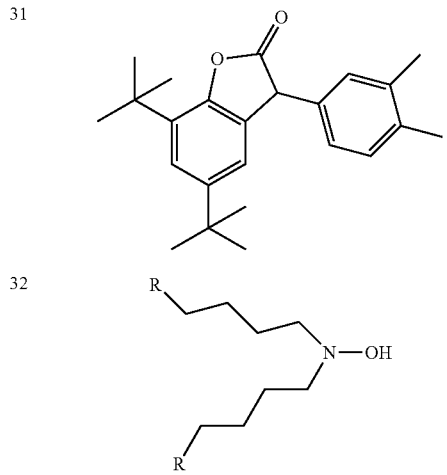

Generally the antioxidant is added to the solvent solution in an amount of less than about 1.0% by weight (e.g., less than about 0.5%, 0.4%, 0.3%, 0.2%, 0.1%, 0.05%, 0.04%, 0.03%, 0.02%, 0.01% or 0.005%).

The antioxidant is added to a solvent to provide an antioxidant/solvent solution. The solution is then generally filtered to remove large particles of antioxidant material, thus reducing the likelihood of damage to the razor blade edges that could be caused by large particles during stirring. In general, a coarse filter is used, filtering particles of about 30 microns in size. In some instances, the solution is flushed with a non-reactive gas such-as argon or nitrogen gas prior to the addition of the coated razor blades into the solution.

In instances where the reaction is performed under inert atmospheric conditions the antioxidant can be added upon completion of the treatment, for example when the solvent solution is exposed to air.

The razor blades are then placed into the solution and stirred, thus removing a portion of the polyfluorocarbon coating.

The temperature and pressure of the treating conditions vary depending on the razor blade coating, the solvent, and the antioxidant. In some instances, the treatment is done at an elevated temperature. In some instance, the temperature is less than the boiling point of the solvent but higher than the dissolution temperature of the polyfluorocarbon. For example, the temperature can be above about 100° C., above about 200° C., or above about 300° C. Generally the reaction temperature is below about 500° C., below about 400° C., or below about 300° C. In instances where the temperature is below the boiling point of the solvent, the reaction conditions generally include atmospheric pressure.

In some instances, the temperature is at or above the boiling point of the solvent. In instances where the temperature is at or above the boiling point of the solvent, elevated pressure is generally used.

The process of solvent treating the polyfluorocarbon coated blade edge is carried out at the temperature required to dissolve the polymer, i.e. within the dissolution temperature range as defined above. In some instances, it is desirable to use increased pressure to reduce solvent loss. In these instances, the treatment of the razor blades is performed at increased pressures (e.g., from about 40 psi to about 120 psi)

In general, the razors are treated in the solvent solution for less than about 30 minutes, for example, less than 25 minutes, or less than 20 minutes. In general, the razors are treated for more than about 1 second, for example more than about 5 seconds, 10, seconds, 30 seconds, 1 minute, 2 minutes, 5 minutes, about 10 minutes, or about 15 minutes. The reaction times are dependent on a variety of factors including but not limited to the solvent, temperature, pressure, and number of blades.

Generally, antioxidant/solvent combinations are chosen where the antioxidant is stable at either the boiling point of the solvent or the dissolution temperature of the polymer coating in the solvent. The boiling point of the solvent and dissolution temperature of the polymer coating in the solvent can change with pressure. Accordingly, the ability to use increased pressure is also considered when choosing an antioxidant/solvent combination.

Examples of desirable solvent properties are provided below:

(1) Polyfluorocarbon-solvency

Melting point depression is used to identify solvency. Polymer melting points and melting depressions in solvents are measured in a Seiko Instrument DSC-220 Differential Scanning Calorimeter (DSC), at a heating rate of 10° C./min in nitrogen. The melting point is the minimum peak of the melting endotherm. Melting depression studies use approximately 5 mg of PTFE/solvent in hermetic aluminum or stainless steel pans or glass ampoules. Liquids which exhibit a PTFE melting point depression are considered to be solvents. The melting point depression establishes the lower range of dissolution temperatures.

(2) Solvent Compatibility at the Dissolution Temperature of the Polyfluorocarbon In some instances, the solvent is a liquid at the dissolution temperature. In other words, the solvent has a boiling point above the processing temperature and a melting point below the dissolution temperature. Of course, these physical properties can be manipulated by changing the processing pressures. While increased pressures are useful and can be used in manufacturing processes, using a solvent that is a liquid at dissolution temperature at ambient pressure eliminates the need to use high pressure equipment, and therefore can, in some instances, reduce the processing costs of the procedure. In cases where higher pressure is used, the solvent generally has a critical temperature above the processing temperature.

(3) Low Polarity

Molecules with low or, most preferably, no polar functionality are most commonly used in the disclosed methods. These molecules, for example, include nonpolar aliphatic, cyclic, or aromatic perfluorocarbons; however, low molecular weight (LMW), fluorine-end-capped homopolymers of hexafluoropropylene epoxide also can be employed.

The solvent, antioxidant, and polymer should be stable at the processing temperature. Agitation will increase the rate of dissolution of the polymer along the blade edge. Two other factors influence the rate of dissolution: (1) higher interfacial surface area between the polymer and solvent gives faster rates, and (2) higher polymer molecular weight and higher polymer concentrations give slower rates of dissolution. The time required for dissolution will vary with the particular polymer and solvent chosen, as well as with the other factors discussed above including antioxidant. Specific examples of the solvent treatment appear in the examples.

Examples of solvents include perfluoroalkanes, perfluorocycloalkanes, perfluoro aromatic compounds and oligomers thereof. Many perfluoropolyethers (PFPE) work in some cases. As used herein, "perfluorocycloalkanes" refers to saturated cyclic compounds, which may contain fused or unfused rings. In addition, the perfluorinated cycloalkane may be substituted by perfluoroalkyl and perfluoroalkylene groups. By "perfluoroalkyl group" we mean a saturated branched or linear carbon chain.

Saturated perfluorocarbons with aliphatic ring structures and high critical temperatures generally provide solubility of PTFE at the lowest temperatures and pressures. Perfluorinated solvents can be obtained, for example, from PCR, Inc., of Gainesville, Fla. Dodecafluorocyclohexane ($C_6F_{12}$), octafluoronaphthalene ($C_{10}F_8$), and perfluorotetracosane (n-$C_{24}F_{50}$) may be obtained from the Aldrich Chemical Co. Perfluorotetradecahydrophenanthrene ($C_{14}F_{24}$), commonly called perfluoroperhydrophenanthrene, may be obtained from F2 Chemicals, Preston Lancashire, England under the tradename Flutec PP11. A mixture of isomers of perfluoroperhydrobenzylnaphthalene ($Cl_7F_{30}$), with the tradename Flutec PP25, may be obtained from F2 Chemicals, Preston Lancashire, England. A high-boiling oligomeric byproduct in the manufacture of Flutec PP11 ($C_{14}F_{23}(C_{14}F_{22})_nC_{14}F_{12}$ where n=0,1 and 2) may be also obtained from DuPont, which is a gross mixture of perfluorocarbons. The approximate boiling range of the components is 280–400° C. When dissolving MP1100, MP1600, LW1200 or Vydax brand PTFE off blade edges, temperatures between 270–340° C. for about 10–200 seconds are generally used.

As used herein, perfluoropolyethers (PFPE) refer to perfluorinated compounds containing the —($CF_2$—CFR—O—)$_n$ linkage where R=F, $CF_3$. These compounds are sometimes called perfluoroalkylether (PFAE) or perfluoropolyalkylether (PFPAE). Preferably, the polymer chain is completely saturated and contains only the elements carbon, oxygen, and fluorine; hydrogen is not present.

The effectiveness of a thinning process can be determined, for example, using a wool felt cutter test, which measures the cutter forces of the blade by measuring the force required by each blade to cut through a wool felt. The cutter forces of a blade can change over time, for example as the blade wears or as the coating on the blade is removed. Accordingly, the blade is run through the wool felt cutter 500 times and the force of each cut is measured on a recorder.

In some instances, after a blade has been solvent treated, the blade is subjected to further processing to remove any excess solvent. This can be done by dipping the blade edge into a wash solution for the solvent.

Generally the blades are washed at a temperature near the boiling point of the wash solution. Fluorinert FC-75 brand perfluoro (2-n-butyl hydrofuran) solvent, manufactured by 3M, and HFC-43 brand 1,1,1,2,3,4,4,5,5,5,-decafluoropentane, manufactured by DuPont, are both useful wash solutions.

Generally the wash solution is easily separable from the solvent to allow the wash solution to be reused. Removing dissolved polyfluorocarbon (e.g., PTFE) from the solvent allows the solvent and/or the PTFE to be reused. The separation of the polyfluorocarbon and the solvent can be accomplished by distillation or other methods known to those of skill in the art.

All percentages and ratios described herein are on a weight basis unless otherwise indicated.

As used herein the term "razor blade cutting edge" includes the cutting point and facets of the blade. Applicant recognizes that the entire blade could be coated in the manner described herein; however, an enveloping coat of the type is not believed to be essential to the present invention. Razor blades according to the present invention include all types known in the art. For example, stainless steel blades are commonly used. Many other commercial razor blades also include a chromium/platinum interlayer between the steel blade and the polymer. This type of interlayer is sputtered onto the blade edge surface prior to polymer coating. Furthermore, the blade material can be coated with a Diamond Like Carbon (DLC) coating as described in U.S. Pat. Nos. 5,142,785 and 5,232,568 prior to polymer coating.

Coating the Blade

A polyfluorocarbon-coated blade edge can be prepared by any process known in the art. For example, the blade edge can be coated with a polyfluorocarbon dispersion. The coated blade is then heated to drive off the dispersing media and sinter the polyfluorocarbon onto the blade edge.

Examples of polyfluorocarbons include MP1100, MP1200, MP1600, and LW1200 brand polytetrafluoroethylene powders manufactured by DuPont.

Polyfluorocarbon dispersions generally include from 0.05 to 5% (wt) polyfluorocarbon, preferably from 0.7 to 1.2% (wt), dispersed in a dispersant media. The polymer can be introduced into the flow stream or mixed directly into an agitated reservoir and then homogenized. When injected into the flow stream, a static mixer downstream is generally used.

Dispersing medium generally includes one or more of a fluorocarbon (e.g. Freon brand from DuPont), water, a volatile organic compounds (e.g. isopropyl alcohol), or a supercritical $CO_2$.

The dispersion can be applied to the cutting edge in any suitable manner, as for example, by dipping or spraying the dispersion onto the blade edge. Where nebulization is used, an electrostatic field can be employed in conjunction with the nebulizer in order to increase the efficiency of deposition. The coating is generally heated upon application to provide improved adhesion.

EXAMPLES

Example 1

Approximately 1500 blades coated with LW-1200 were stacked at an end of a modified stirring shaft of a 350 ml Parr 4560 Mini-reactor (the washer). The washer was then filled with ⅔ of Flutec PP11 solvent plus IRGANOX B-215 (0.01%) antioxidant. Argon was flushed through a syringe for 5 minutes at the flow rate of 22 scfh. The entire apparatus was closed and Argon was flushed via the gas outlet of the bomb for additional 5 minutes. The washer was then sealed and heated until it reached 250° C. The stirring shaft was started and rotated at 80 rev/min until the temperature reached 273° C. The temperature was then maintained at 273° C. for about 90 seconds. At this time, pressure in the chamber reached 40–60 psi. Heating was stopped and air cooling was introduced to cool down the washer. Stirring was then stopped when the temperature reached 260° C. Blades were removed when temperature was around 60° C.

Example 2

A solution of antioxidant (IRGANOX B-215) and solvent (FLUTEC PP11) was added to a pressure vessel (filling about half full). The solution was then flushed with either Nitrogen for about 5 minutes. After the solution was flushed, a spindle of PTFE-coated razor blades was inserted into the pressure vessel, submerging the razor blades in the antioxidant/solvent solution. The solution was again flushed with Nitrogen or Argon for about 3 minutes. The pressure vessel was then sealed, and the pressure was increased to about 40 psi. The temperature of the solvent was increased to about 280° C. while stirring the spindle of coated razor blades. The blades were stirred for less than about 2 minutes. Upon completion, the temperature in the reaction vessel was cooled and the pressure subsequently released. In some instances, the blades were further subjected to a wash step to remove any remaining solvent.

Table 4 below depicts the cutter forces of three razor blades for the first cut, the $5^{th}$ cut, and the $500^{th}$ cut. The razor blades are described using three different hard coating materials A, B, and C. As can be seen, the razor blades treated with the Flutec™ solvent and the antioxidant IRGANOX B-215 have more consistent first and fifth cutter forces than the razor blades treated with Flutec™ solvent alone. Moreover, consistently lower $L_{500}$ values were observed on all coatings when the antioxidant was added, making the use of the Flutec™ solvent with antioxidant more reproducible than the use of Flutec™ solvent alone. Without wishing to be bound by theory, it is believed that the antioxidant improves the stability of the solvent, which improves the reproducibility of the blade thinning. Accordingly, the use of antioxidant provides an improved manufacturing method as the combination allows greater consistency and reproducibility among the various razor blades.

TABLE 4

Comparison of Razor Blades Treated With Flutec™ solvent With and Without Antioxidant
Flutec with Antioxidant improves the cutter forces of blades having various coatings

| Hard Coating | Flutec™ solvent without antioxidant | | | Flutec™ solvent with antioxidant* | | |
|---|---|---|---|---|---|---|
| | $1^{st}$ Cut | $L_{5, lb}$ | **$L_{500, lb}$ | $1^{st}$ Cut | $L_{5, lb}$ | $L_{500, lb}$ |
| A | 1.51 | 1.37 | 1.92 | 1.02 | 1.08 | 1.21 |
| B | 1.1 | 1.08 | 1.64 | 1.06 | 1.08 | 1.42 |
| C | 0.97 | 0.95 | 1.75 | 1.06 | 1.07 | 1.42 |

*Irganox B-215 antioxidant
**$L_{500, lb}$ is an average of cutter forces between the $500^{th}$ and $505^{th}$ cut.

A number of embodiments of the invention have been described. Nevertheless, it will be understood that various modifications may be made without departing from the spirit and scope of the invention. Accordingly, other embodiments are within the scope of the following claims.

What is claimed is:

1. A method of treating a polyfluorocarbon coated razor blade, comprising:
   contacting a polyfluorocarbon coated razor blade with a solution of a solvent and an antioxidant, thereby partially removing the polyfluorocarbon coating from the razor blade.

2. The method of claim 1 wherein the polyfluorocarbon comprises polytetrafluoroethylene.

3. The method of claim 1 wherein the antioxidant comprises a phenol moiety.

4. The method of claim 3 wherein the phenol moiety comprises a compound of formula I

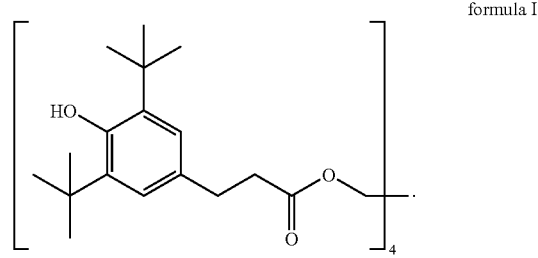

formula I

5. The method of claim 1 wherein the antioxidant comprises an organophosphorous moiety.

6. The method of claim 5 wherein the organophosphorous moiety comprises a compound of formula II

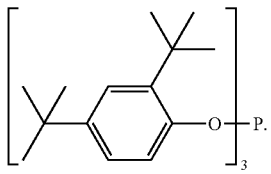

formula II

7. The method of claim 1 wherein the antioxidant comprises a lactone, a hydroxylamine, or a combination thereof.

8. The method of claim 1 wherein the concentration of antioxidant in the solvent is less than about 0.1%.

9. The method of claim 8 wherein the concentration of antioxidant in the solvent is less than about 0.05%.

10. The method of claim 9 wherein the concentration of antioxidant in the solvent is less than about 0.01%.

11. The method of claim 1 wherein the antioxidant is stable at a temperature greater than or equal to the boiling point of the solvent.

12. The method of claim 1 wherein the solvent comprises at least one of a perfluoroalkane, perfluorocycloalkane, perfluoroaromatic or an oligomer thereof.

13. The method of claim 12 wherein the solvent comprises at least one of dodecafluorocyclohexane, octafluoronapthalene, perfluorotetracosane, perfluorotetradecahydrophenanthrene, isomers of perfluoroperhydrobenzylnaphthalene, erfluorotetradecahydrophenanthrene, high-boiling oligomeric byproduct in the manufacture of perfluorotetradecahydrophenanthrene, or perfluoropolyethers.

14. The method of claim 13 wherein the solvent comprises a perfluoroperhydrophenanthrene oligomer having the general formula $C_{14}F_{23}(C_{14}F_{22})_nC_{14}F_{23}$ wherein n is 0, 1, or 2.

15. The method of claim 13 wherein the solvent comprises perfluorotetradecahydrophenanthrene.

16. The method of claim 14 wherein the solvent further comprises a plurality of antioxidants.

17. The method of claim 1 further comprising removing the solvent subsequent to contact with the razor blade.

18. The method of claim 17 wherein the solvent is removed by dipping the blade in a wash solution.

19. The method of claim 17 wherein, wherein the temperature of the wash solution is near the boiling point of the wash solution.

20. The method of claim 17 wherein the wash solution comprises perfluoro (2-n-butylhydrofuran).

21. The method of claim 1 wherein the boiling point of the solvent is greater than the dissolution temperature for the polyfluorocarbon in the solvent.

22. The method of claim 21 wherein the razor blade is treated with solvent at a temperature below the boiling point of the solvent but greater than or equal to the dissolution temperature for the polyfluorocarbon in the solvent.

23. The method of claim 21 wherein the razor blade is treated with solvent at a temperature above the boiling point of the solvent and greater than or equal to the dissolution temperature for the polyfluorocarbon in the solvent.

24. The method of claim 1, wherein the razor blade is coated with a polyfluorocarbon by applying a dispersion of the polyfluorocarbon onto the razor blade and subsequently heating the dispersion to a temperature sufficient to adhere the polyfluorocarbon to the razor blade.

25. The method of claim 24, wherein the dispersion is applied onto the razor blade by spraying the dispersion onto the razor blade.

26. The method of claim 24, wherein the dispersion is applied onto the razor blade by dipping the razor blade into the dispersion.

27. The method of claim 1, wherein razor blade comprises a cutting edge and the cutting edge is coated with a polyfluorocarbon.

28. The method of claim 1 further comprising filtering the solution.

29. The method of claim 1 comprising contacting the polyfluorocarbon coated razor blade with a plurality of antioxidants.

30. The method of claim 29 wherein the antioxidants comprise a phenyl moiety and an organophosphorous moiety.

31. The method of claim 30 wherein the antioxidants comprise

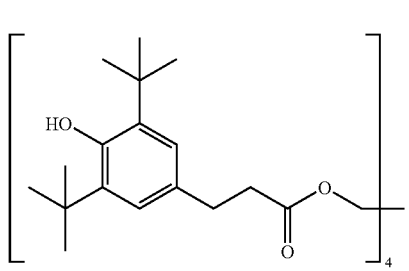

formula I and

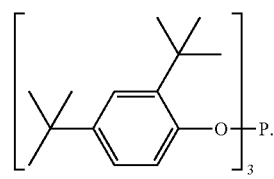

formula II

32. The method of claim 31 wherein the ratio of formula I/formula II is 1/2.

33. The method of claim 1 wherein the temperature of the solution is between about 200 and 400° C.

34. The method of claim 33 wherein the temperature of the solution is between about 250 and about 350° C.

35. The method of claim 33 wherein the temperature of the solution is between about 260 and about 300° C.

36. The method of claim 33 wherein the temperature of the solution is about 280° C.

37. The method of claim 1 wherein the solution is subjected to a pressure of between about 30 and 120 psi.

38. The method of claim 37 wherein the solution is subjected to a pressure of between about 40 and 60 psi.

39. A method of treating a polyfluorocarbon coated razor blade, comprising:

contacting a polyfluorocarbon coated razor blade with a solution of a perfluoroperhydrophenanthrene and a 1/2 ratio of the compounds of formula I and formula II

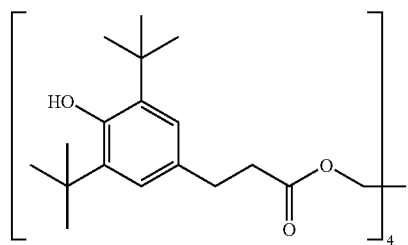
formula I
and
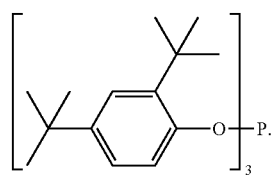
formula II
* * * * *

UNITED STATES PATENT AND TRADEMARK OFFICE
CERTIFICATE OF CORRECTION

PATENT NO. : 7,247,249 B2  Page 1 of 1
APPLICATION NO. : 11/033181
DATED : July 24, 2007
INVENTOR(S) : Hoang Mai Trankiem It is certified that error appears in the above-identified patent and that said Letters Patent is hereby corrected as shown below:

<u>Column 5</u>

Table 1, between the symbols "O", insert the symbol --N--.

<u>Column 13</u>

Line 66, between the words "such" and "as", delete the hyphen.

Signed and Sealed this

Twenty-fifth Day of December, 2007

JON W. DUDAS
*Director of the United States Patent and Trademark Office*